(12) United States Patent
Lee (10) Patent No.: US 11,832,342 B2
(45) Date of Patent: Nov. 28, 2023

(54) APPARATUS AND METHOD FOR SENDING EMERGENCY CALL

(71) Applicants: Hyundai Motor Company, Seoul (KR); Kia Corporation, Seoul (KR)

(72) Inventor: Jae Hoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 132 days.

(21) Appl. No.: 17/520,160

(22) Filed: Nov. 5, 2021

(65) Prior Publication Data

US 2022/0151020 A1    May 12, 2022

(30) Foreign Application Priority Data

Nov. 9, 2020  (KR) .................. 10-2020-0148712

(51) Int. Cl.

| | |
|---|---|
| *H04W 76/50* | (2018.01) |
| *H04W 76/18* | (2018.01) |
| *G08B 25/00* | (2006.01) |
| *G08B 25/01* | (2006.01) |
| *H04M 3/51* | (2006.01) |

(52) U.S. Cl.
CPC .......... *H04W 76/50* (2018.02); *G08B 25/004* (2013.01); *G08B 25/016* (2013.01); *H04M 3/5108* (2013.01); *H04W 76/18* (2018.02)

(58) Field of Classification Search
CPC ....... H04W 76/50; H04W 76/18; H04W 4/90; G08B 25/004; G08B 25/016; G08B 25/01; G08B 29/18; H04M 3/5108; H04M 7/006; H04M 2242/04; H04M 2242/30; H04M 11/04; B60R 16/023; B60R 16/0315; B60R 16/0373

See application file for complete search history.

(56) References Cited

U.S. PATENT DOCUMENTS

| | | | | |
|---|---|---|---|---|
| 8,718,797 | B1 * | 5/2014 | Addepalli | ............. B60R 16/023 700/83 |
| 9,734,721 | B2 * | 8/2017 | Stenneth | ............... G08B 25/001 |
| 9,820,308 | B2 * | 11/2017 | Kim | ....................... H04W 76/14 |
| 9,867,022 | B1 * | 1/2018 | Schaefer, Jr. | ......... H04W 64/00 |
| 10,972,893 | B1 * | 4/2021 | Vangala | .................. H04W 4/46 |
| 2015/0245388 | A1 * | 8/2015 | Yerrabommanahalli | .................... H04L 65/1016 455/404.1 |
| 2017/0046216 | A1 * | 2/2017 | Stenneth | ............... G08B 25/016 |

(Continued)

OTHER PUBLICATIONS

Martinez, Francisco J., et al. "Emergency services in future intelligent transportation systems based on vehicular communication networks." IEEE Intelligent Transportation Systems Magazine 2.2 (2010): 6-20. (Year: 2010).*

(Continued)

*Primary Examiner* — Sharad Rampuria
(74) *Attorney, Agent, or Firm* — Slater Matsil, LLP (57) ABSTRACT

An embodiment emergency call sending apparatus includes a telematics module configured to send an emergency call when an accident occurs, and an emergency call complementing module configured to monitor whether an emergency call transmission executed by the telematics module succeeds or fails, search for an available network near a vehicle, access the available network when the emergency call transmission fails, and control a complement of the emergency call transmission.

19 Claims, 5 Drawing Sheets

(56) References Cited

U.S. PATENT DOCUMENTS

2017/0135136 A1* 5/2017 Lei .................... H04M 1/72454
2017/0188395 A1* 6/2017 Kim ........................ H04W 4/40

OTHER PUBLICATIONS

Chang, Wan-Jung, Liang-Bi Chen, and Ke-Yu Su. "DeepCrash: A deep learning-based Internet of vehicles system for head-on and single-vehicle accident detection with emergency notification." IEEE Access 7 (2019): 148163-148175. (Year: 2019).*

* cited by examiner

APPARATUS AND METHOD FOR SENDING EMERGENCY CALL

CROSS-REFERENCE TO RELATED APPLICATIONS

This application claims the benefit of Korean Patent Application No. 10-2020-0148712, filed in the Korean Intellectual Property Office on Nov. 9, 2020, which application is hereby incorporated herein by reference.

TECHNICAL FIELD

The present disclosure relates to an apparatus and method for sending an emergency call.

BACKGROUND

A driver remotely diagnoses a vehicle over a wireless network. In addition, while the driver is in the vehicle, the driver receives traffic and living information. In case of emergency, a telematics service automatically makes a request for emergency rescue. Nowadays, the spread of the telematics service is expanding.

When an accident of a vehicle occurs, the telematics service automatically makes an emergency call to the nearest rescue team based on the vehicle's location and then makes it possible to carry out rapid rescue activities. Thus, even though the driver loses consciousness in the accident, the wounded driver may be rescued quickly and appropriately.

To this end, when an accident occurs, a conventional telematics service makes an emergency call over a trusted network based on LTE or 3G, and then sends information about the vehicle's current location to a rescue team.

However, external shocks may also affect a telematics controller installed in a vehicle when an accident occurs. Accordingly, when the controller is damaged due to such external shocks, an emergency call based on a telematics service may fail to be made due to the malfunction of the telematics controller. Nevertheless, there is no fail-safe means or method for complementing the failure of an emergency call transmission.

In particular, when an accident that causes a large impact capable of damaging a plurality of controllers provided in a vehicle occurs as compared to an accident with a minor impact, it is more important to make an emergency call. Accordingly, when an emergency call using a trusted network fails to be made due to damage to the telematics controller, there is a need for a means capable of increasing the success rate of making the emergency call by complementing the failure.

SUMMARY

The present disclosure relates to an apparatus and method for sending an emergency call. Particular embodiments relate to an apparatus and method for sending an emergency call that are capable of increasing a transmission success rate of an emergency call when an accident of a vehicle occurs.

Embodiments of the present disclosure can solve problems occurring in the prior art while advantages achieved by the prior art are maintained intact.

An embodiment of the present disclosure provides an apparatus and method for sending an emergency call that include a telematics module making an emergency call when an accident occurs, an emergency call complementing module monitoring whether the emergency call transmission executed by the telematics module succeeds or fails, searching for an available network near a vehicle when the emergency call transmission fails, accessing the available network, and controlling the complement of the emergency call transmission, and an audio video navigation (AVN) module complementing an emergency call transmission by using a connected available network, thereby improving the success rate of emergency call transmission.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, an emergency call sending apparatus includes a telematics module sending an emergency call when an accident occurs and an emergency call complementing module monitoring whether an emergency call transmission executed by the telematics module succeeds or fails, searching for an available network near a vehicle, accessing the available network when the emergency call transmission fails, and controlling a complement of the emergency call transmission.

Furthermore, according to an embodiment of the present disclosure, the emergency call complementing module monitors whether the emergency call transmission using the telematics module succeeds or fails after the accident occurs, and controls the emergency call transmission using another network and another module to be performed when the emergency call transmission fails.

Moreover, according to an embodiment of the present disclosure, the emergency call complementing module includes an emergency call monitoring device monitoring whether the emergency call transmission executed by the telematics module succeeds or fails, an available network searching device searching for an available network accessed by the vehicle and to establish a communication path when the emergency call transmission in the telematics module fails, and an emergency call complementing device sending the emergency call by using the available network establishing the communication path.

Also, according to an embodiment of the present disclosure, the emergency call monitoring device recognizes whether the emergency call transmission fails, by receiving information about whether the emergency call transmission succeeds or fails, from the telematics module.

In addition, according to an embodiment of the present disclosure, the emergency call monitoring device recognizes that the emergency call transmission fails, when information about whether the emergency call transmission succeeds or fails is not received from the telematics module until a waiting time measured by a timer activated from occurrence of the accident passes a predetermined reference time.

Furthermore, according to an embodiment of the present disclosure, the available network searching device searches for one or more available networks capable of being accessed by a communication means provided in the vehicle, in which the accident occurs, selects a network, which has a relatively large signal strength, from among the found available networks, accesses the network, and establishes the communication path.

Moreover, according to an embodiment of the present disclosure, the available network accessed by the available network searching device is an un-trusted network including WiFi and a hotspot.

Also, according to an embodiment of the present disclosure, the emergency call complementing module further includes a voice processing device activating device that determines whether a function of a voice processing device, which includes a microphone and a speaker and which is capable of processing a voice signal for the emergency call, is operated normally, and activates the voice processing device when the function is operated normally.

In addition, according to an embodiment of the present disclosure, the emergency call complementing module further includes a message generating device that generates an emergency call request message for providing a notification of whether the accident occurs, and an accident vehicle's current location.

In addition, according to an embodiment of the present disclosure, the emergency call sending apparatus further includes an audio video navigation (AVN) module that complements the emergency call transmission by using the available network establishing the communication path by the available network searching device.

According to an embodiment of the present disclosure, an emergency call sending method includes monitoring whether an emergency call transmission executed by a telematics module succeeds or fails, when an accident occurs, searching for an available network near a vehicle when the emergency call transmission fails, selecting the available network accessible by a communication means of the vehicle, and establishing a communication path, and additionally performing the emergency call transmission by an AVN module, using the available network establishing the communication path.

Furthermore, according to an embodiment of the present disclosure, the searching for the available network includes searching for one or more available networks capable of being accessed by a communication means provided in the vehicle in which the accident occurs and comparing signal strengths of found available networks with one another and selecting an available network, which has relatively great signal strength, from among the found available networks as a network for complementing an emergency call to establish the communication path.

Moreover, according to an embodiment of the present disclosure, the emergency call sending method further includes determining whether a function of a voice processing device, which includes a microphone and a speaker and which is capable of processing a voice signal for an emergency call, is operated normally, and activating the voice processing device when the function is operated normally, after the searching for the available network.

Besides, according to an embodiment of the present disclosure, the emergency call sending method further includes generating an emergency call request message for providing a notification of whether the accident occurs, and an accident vehicle's current location, after the searching for the available network.

Also, according to an embodiment of the present disclosure, the performing of the emergency call transmission includes making a voice-based VoIP emergency call when a voice processing device is operated normally and making an SMS-based emergency call for sending an emergency call request message for providing an accident vehicle's current location when the voice processing device is damaged.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matter of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 5.

Figure 1:
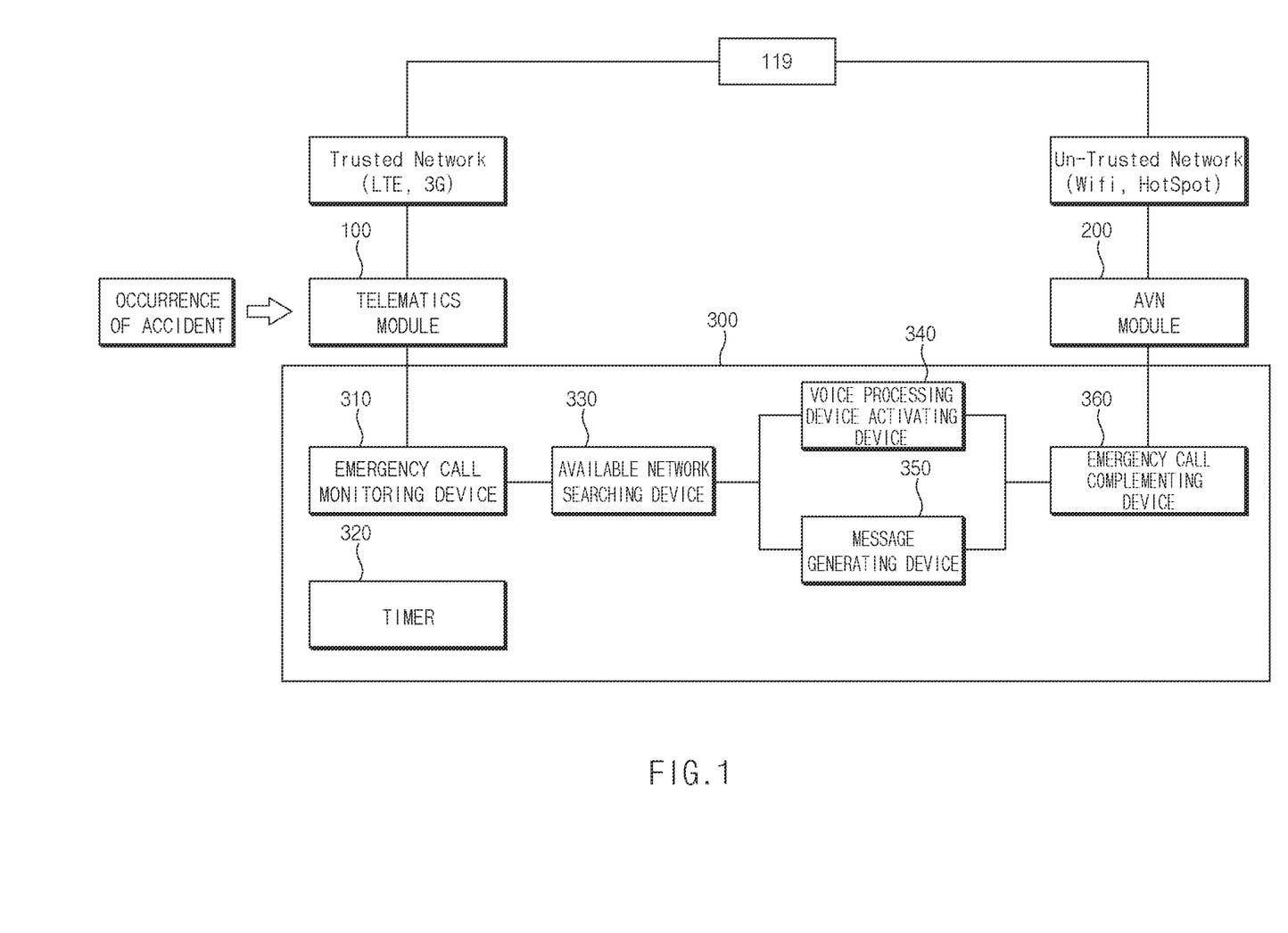
FIG. 1 is a block diagram of an emergency call sending apparatus according to an embodiment of the present disclosure.
Figure 2:
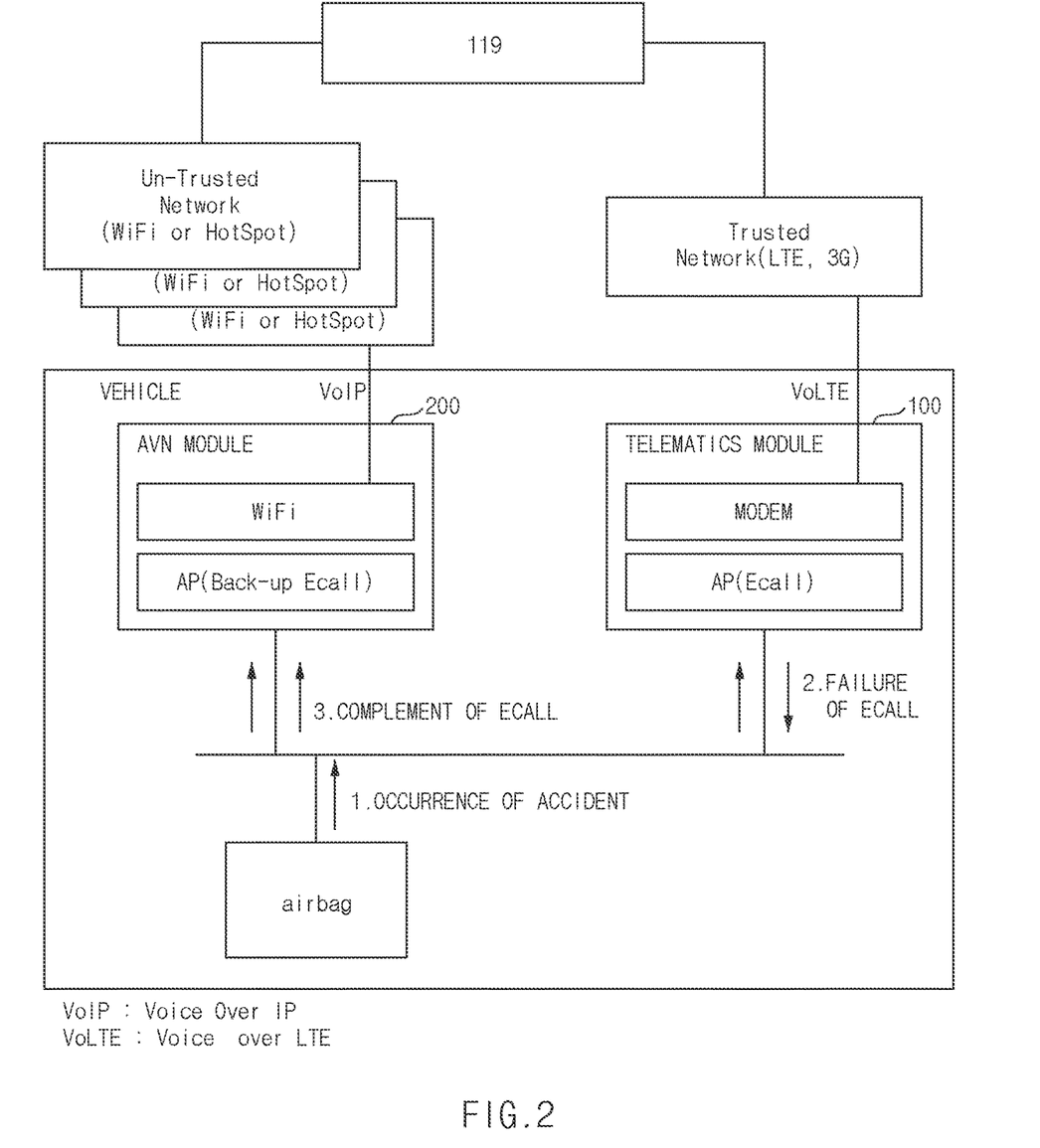
FIG. 2 is a configuration diagram illustrating that an emergency call transmission is complemented, according to an embodiment of the present disclosure.
Figure 3:
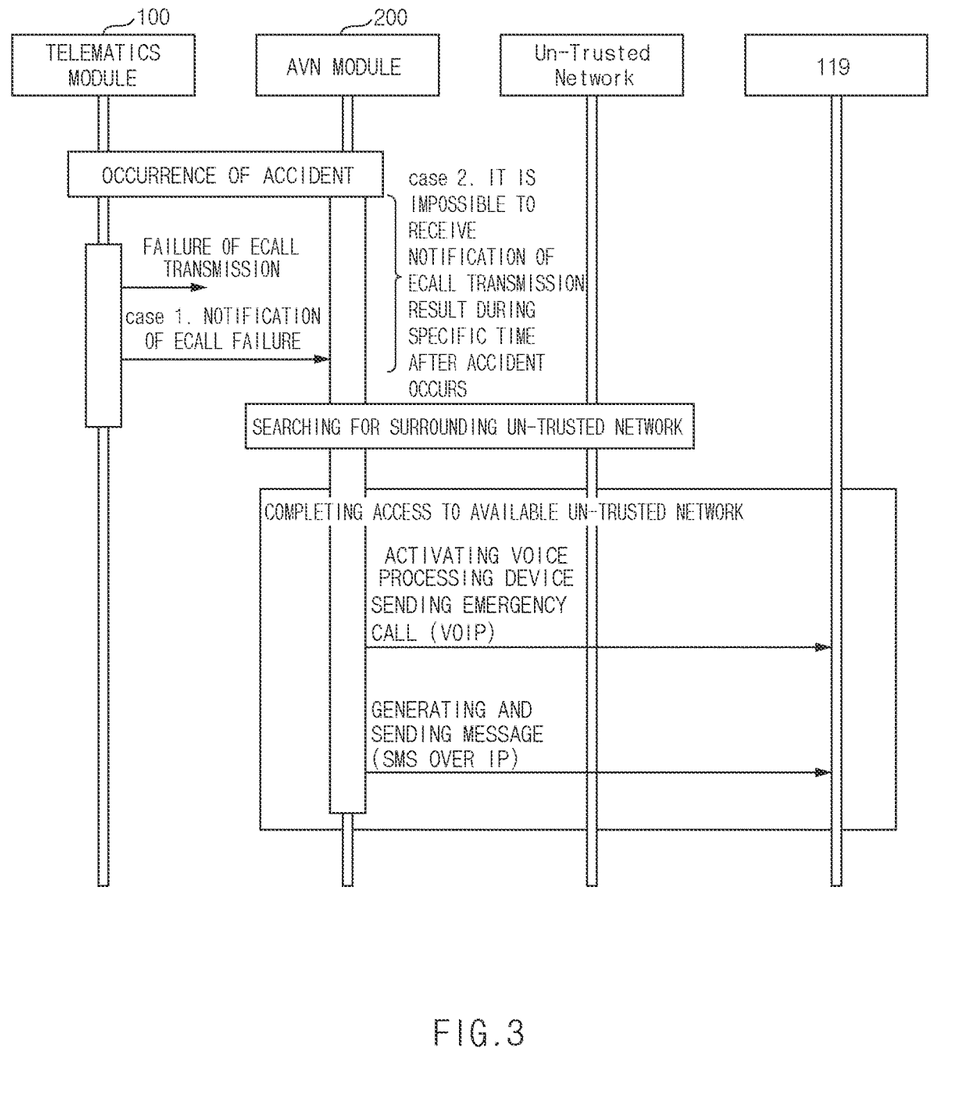
FIG. 3 is a flowchart illustrating a data processing procedure in which an emergency call transmission is complemented, according to an embodiment of the present disclosure.

FIG. 1 is a block diagram of an emergency call sending apparatus according to an embodiment of the present disclosure. FIG. 2 is a configuration diagram illustrating that an emergency call transmission is complemented, according to an embodiment of the present disclosure. FIG. 3 is a flowchart illustrating a data processing procedure in which an emergency call transmission is complemented, according to an embodiment of the present disclosure.

Referring to FIG. 1, an emergency call sending apparatus according to an embodiment of the present disclosure may include a telematics module 100, an AVN module 200, and an emergency call complementing module 300. The telematics module 100 may make an emergency call when an accident occurs. The AVN module 200 may complement an emergency call transmission by using a connected available network. The emergency call complementing module 300 may monitor whether the emergency call transmission executed by the telematics module 100 succeeds or fails, may search for an available network near a vehicle when the emergency call transmission fails, may access the available network, and may control the complement of the emergency call transmission.

As illustrated in FIG. 2, when an accident, in which an air bag is deployed, is detected by a shock detection signal transmitted from a shock sensor provided in a vehicle, the telematics module 100 may make an emergency call for requesting emergency rescue while delivering the fact that the accident occurs, and a vehicle's current location (information about latitude and longitude) to the nearest rescue team 119 based on information about the vehicle's current location.

At this time, the telematics module 100 may make an emergency call based on voice over LTE (VoLTE), by using its own modem or a trusted network with high data transmission speed and excellent security such as long term evolution (LTE) and 3G under control of an application processor (AP).

The emergency call complementing module 300 may monitor whether emergency call transmission using the telematics module 100 succeeds or fails, after an accident occurs. When it is determined that the emergency call transmission fails, the emergency call complementing module 300 may allow an emergency call to be made using another network and another module, as a fail-safe means for improving the success rate of the emergency call transmission.

To the end, the emergency call complementing module 300 may include an emergency call monitoring device 310, an available network searching device 330, and an emergency call complementing device 360. The emergency call monitoring device 310 may monitor whether emergency call transmission executed in a telematics module succeeds or fails. The available network searching device 330 may establish a communication path by searching for an available network accessible in a vehicle when the emergency call transmission in the telematics module fails. The emergency call complementing device 360 may make an emergency call by using the AVN module 200 on the available network that establishes the communication path.

As shown in FIG. 3, the emergency call monitoring device 310 may directly receive information about whether the emergency call transmission succeeds or fails from the telematics module 100 and then may recognize whether the emergency call transmission fails. When a communication means such as a modem or an antenna provided in the telematics module 100 is damaged due to the impact of an accident, even though an emergency call is attempted during a predetermined time or the predetermined number, it is impossible to access a rescue team 119 or call center. In this case, the controller provided in the telematics module 100 may transmit the information about whether the emergency call transmission succeeds or fails to the emergency call monitoring device 310 and then may provide a notification of the information.

However, when a controller equipped in the telematics module 100 is also damaged, it is impossible to transmit such information about whether the emergency call transmission succeeds or fails. The emergency call monitoring device 310 may further include a timer 320. The timer 320 may be activated from a point in time from the occurrence of an accident to measure a waiting time such that a time required to wait for a notification of the information about whether the emergency call transmission succeeds or fails is measured after an accident occurs.

As shown in FIG. 3, when the emergency call monitoring device 310 fails to receive the information about whether the emergency call transmission succeeds or fails from the telematics module 100 until a waiting time measured by the timer 320 passes a predetermined reference time after the accident occurs, the emergency call monitoring device 310 may be configured to recognize that the emergency call transmission fails.

As such, after recognizing that the emergency call transmission fails, by the information about whether the emergency call transmission succeeds or fails, transmitted directly from the telematics module 100 or the elapse of the waiting time measured from the timer 320, the emergency call monitoring device 310 may determine whether to execute a fail-safe, which is a countermeasure against a transmission failure.

The available network searching device 330 may search for one or more available networks capable of being accessed by a communication means provided in a vehicle, in which an accident occurs, may select a network, which has a large strength of a signal, from among the found available networks, may access the network, and may establish a communication path.

The available network accessed by the available network searching device 330 may be an un-trusted network, such as WiFi and hotspot, which also has a slow data transmission speed and weak security.

As such, the available network searching device 330 may establish a communication path for emergency call transmission through another network, not a trusted network used for emergency call transmission in the telematics module 100, and thus may secure a countermeasure against damage to a communication means such as a modem or an antenna.

Furthermore, the available network searching device 330 may establish a communication path, using a network, which has the largest strength of a signal, from among the found un-trusted networks, and thus may improve the success rate of emergency call transmission.

Moreover, the emergency call complementing module 300 may further include a voice processing device activating device 340. The voice processing device activating device 340 may determine whether a function of a voice processing device, which includes a microphone and a speaker and which is capable of processing a voice signal for an emergency call, is operated normally, and may activate the voice processing device for an emergency call.

When it is determined, by the voice processing device activating device 340, that the microphone and the speaker are operating normally, the emergency call to a remote rescue team 119 or a call center may be made through the microphone and the speaker.

In addition, the emergency call complementing module 300 may further include a message generating device 350. It may be difficult to make a call using a voice even though the emergency call transmission is successful because a microphone or speaker is damaged due to the impact of the accident. At this time, the message generating device 350 may generate an emergency call request message for providing a notification of whether an accident occurs, and an accident vehicle's current location.

The message generating device 350 includes information about the current location (including latitude, longitude, or the like) of an accident vehicle, thereby helping the rapid rescue of a rescue team receiving the information.

At this time, after the available network searching device 330 accesses an available network establishing a communication path by using the AVN module 200, the emergency call complementing device 360 may make a VoIP-based emergency call.

Also, when it is difficult to make a VoIP-based emergency call because the voice processing device is damaged, the AVN module 200 may send the emergency call request message generated by the message generating device 350, and then may provide a notification that an accident occurs.

The emergency call complementing device 360 may make an emergency call to a rescue team or a call center by means of IP-based voice over IP (VoIP) using a voice processing device through the communication path accessed by the available network searching device 330. In addition, the emergency call complementing device 360 may make a request for rescue while providing a notification that an accident occurs, by sending an emergency call request message by short message service (SMS) over IP generated by the message generating device 350 upon damaging the voice processing device.

The AVN module 200 may provide a notification that an accident occurs, by making a VoIP-based emergency call using a voice processing device, over the available network connected by the emergency call complementing module 300, or transmitting an emergency call request message generated by the message generating device 350. Accordingly, the AVN module 200 may make a request for rescue.

As such, embodiments of the present disclosure may monitor whether emergency call transmission succeeds or fails, through a trusted network in a telematics module, may broadly search for available networks including an un-trusted network in preparation for damage to a communication means to access one of the found available networks, may change an AVN module to a subject of the emergency call transmission in preparation for damage to the telematics module due to the impact of an accident, may enable an emergency call request message to be generated or sent in preparation for damage to a voice processing device such as a microphone or speaker, and may make all types of emergency calls in preparation for damage to a vehicle due to an accident, thereby quickly and stably coping with the accident.

Next, an emergency call sending method according to another embodiment of the present disclosure will be described with reference to FIGS. 4 and 5.

Figure 4:
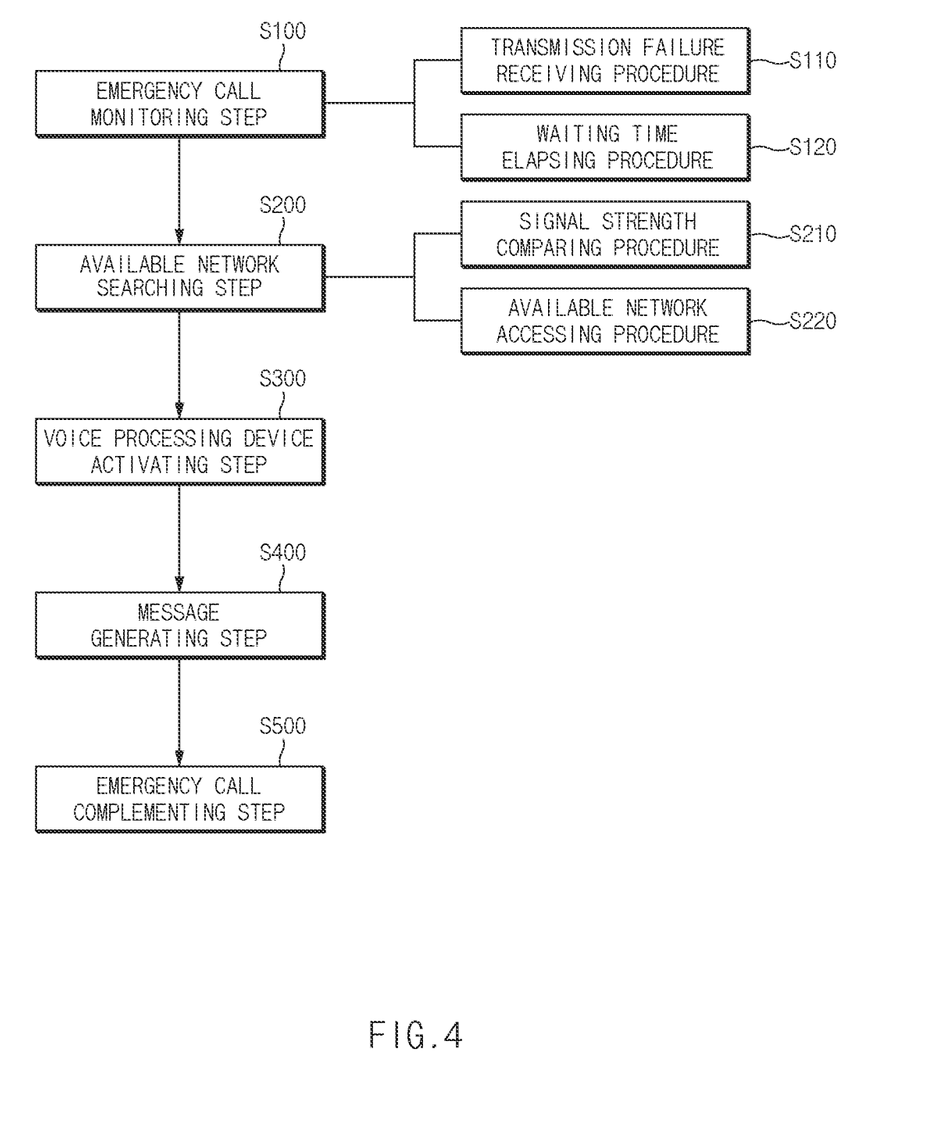
FIG. 4 is a configuration diagram of an emergency call sending method, according to another embodiment of the present disclosure.

FIG. 4 is a configuration diagram of an emergency call sending method, according to another embodiment of the present disclosure. FIG. 5 is a flowchart illustrating that an emergency call transmission is complemented, according to another embodiment of the present disclosure.

Figure 5:
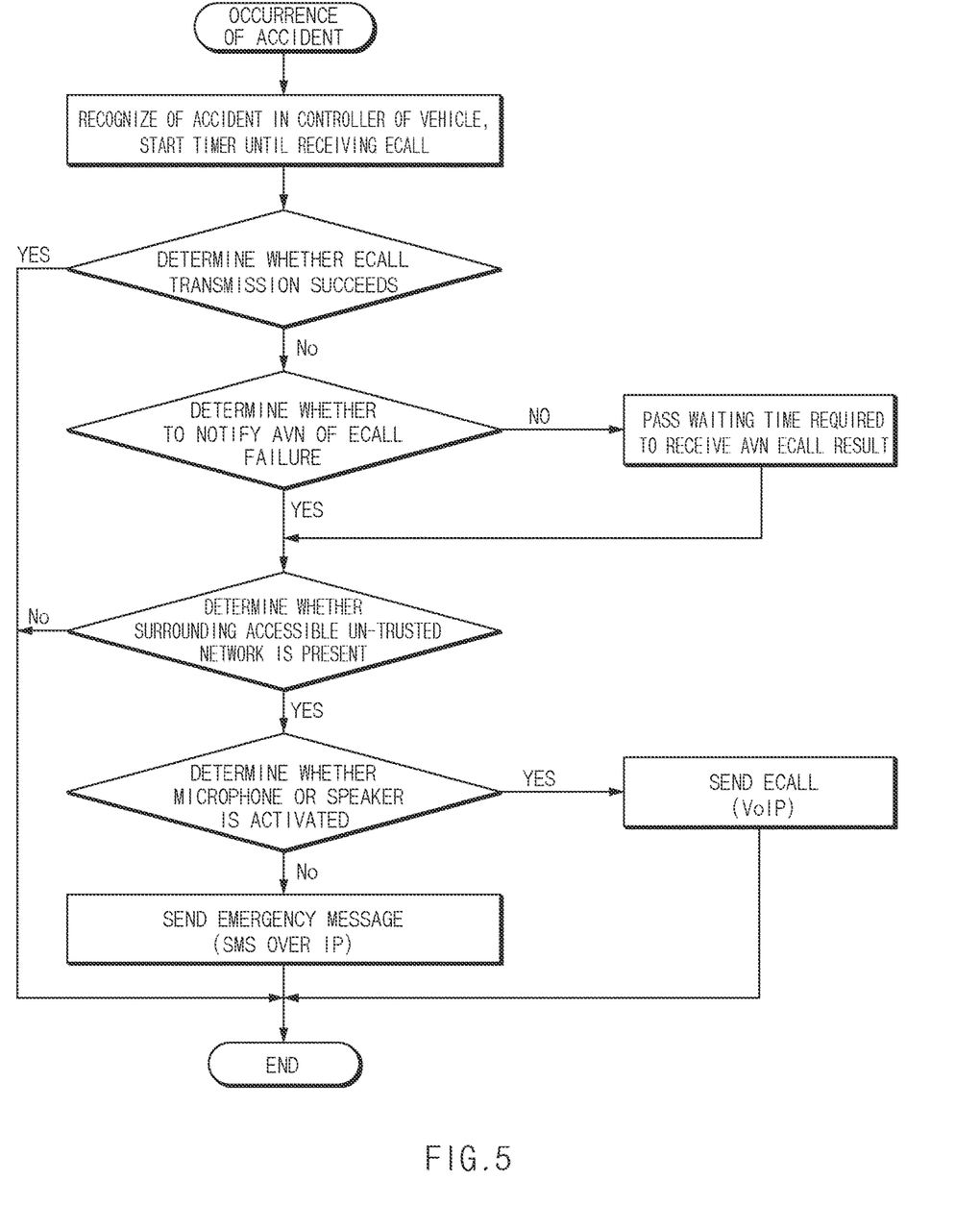
FIG. 5 is a flowchart illustrating that an emergency call transmission is complemented, according to another embodiment of the present disclosure.

Referring to FIGS. 4 and 5, an emergency call sending method according to another embodiment of the present disclosure may include an emergency call monitoring step S100, an available network searching step S200, and an emergency call complementing step S500. The emergency call monitoring step S100 may include a step of monitoring whether emergency call transmission executed by a telematics module when an accident occurs succeeds or fails. The available network searching step S200 may include a step of searching for an available network near a vehicle when the transmission fails, accessing the available network accessible by the vehicle's communication means, and establishing a communication path. The emergency call complementing step S500 may include a step of additionally executing the emergency call transmission by an AVN module by using the available network establishing the communication path.

The emergency call monitoring step S100 may include a step of monitoring whether VoLTE-based emergency call transmission executed using a trusted network such as LTE or 3G network by the telematics module succeeds or fails, after it is detected that an accident occurs.

When it is determined, based on these monitoring results, that emergency call transmission fails, the emergency call transmission using another network and another module as a fail-safe means may be made.

To the end, the emergency call monitoring step S100 may include a transmission failure receiving procedure S110 of directly receiving information about whether the emergency call transmission succeeds or fails, from the telematics module and recognizing whether the emergency call transmission fails.

In the transmission failure receiving procedure S110, when it is impossible to connect to a rescue team or call center even though making an emergency call is attempted during a predetermined time or the number of times, an emergency call complementing module may receive transmission failure information transmitted from the telematics module, and thus an emergency call complementing module may recognize that emergency call transmission fails.

Furthermore, the emergency call monitoring step S100 may further include a waiting time elapsing procedure S120. The waiting time elapsing procedure S120 may include a step of determining that the emergency call transmission fails, when information about the success or failure of emergency call transmission is not received from the telematics module until a waiting time of a timer, which is started to measure the waiting time from a point in time when an accident occurs, passes a specific reference time.

As such, even when it is determined, in the waiting time elapsing procedure S120, that information about whether the transmission succeeds or fails is not received from the telematics module, it is possible to complement an emergency call quickly after a specific time, thereby improving the success rate of emergency call transmission.

Moreover, the available network searching step S200 may include a signal strength comparing procedure S210 and an available network accessing procedure S220. The signal strength comparing procedure S210 may include a step of searching for one or more available networks capable of being accessed by a communication means provided in a vehicle in which an accident occurs and comparing signal strengths of found available networks. The available network accessing procedure S220 may include a step of selecting an available network, which has relatively great signal strength, from among the found available networks as a network for complementing an emergency call and establishing a communication path.

At this time, in the available network searching step S200, it is possible to select a network, which has the largest signal strength, from among un-trusted networks such as Wi-Fi or a hotspot that is capable of being accessed by the vehicle's communication means and to establish a communication path.

As such, even though parts required to access a trust network such as a modem or an antenna are damaged, it is possible to improve the success rate of emergency call transmission by selecting a new network, which has not been accessed by the telematics module, as a new network for complementing an emergency call.

Moreover, the emergency call complementing module 300 may further include a voice processing device activating step S300. The voice processing device activating step S300 may include a step of determining whether a function of a voice processing device, which includes a microphone and a speaker and which is capable of processing a voice signal for an emergency call, is operated normally, and may activate the voice processing device for an emergency call.

It is necessary to determine whether a voice processing device is operating normally in the voice processing device activating step S300. After complementing an emergency call is successful, a VoIP-based emergency call for making a requesting for rescue to a rescue team may be made smoothly.

Besides, the emergency call sending method may further include a message generating step S400. The message generating step S400 may include a step of generating an emergency call request message for providing a notification of whether an accident occurs and an accident vehicle's current location (including latitude and longitude) when it is determined in the voice processing device activating step S300 that the voice processing device is damaged.

In addition, in the emergency call complementing step S500, complementing an emergency call transmission by an AVN module using an available network establishing a new communication path may be performed as a fail-safe for the failure of an emergency call in a telematics module.

At this time, in the emergency call complementing step S500, when the voice processing device is normally activated in the voice processing device activating step S300, a voice-based VoIP emergency call may be made; and, when the voice processing device is damaged and an emergency call request message is generated in the message generating step S400, an SMS-based emergency call transmission may be made.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for the illustrative purpose. The scope of protection of the present disclosure should be construed by the attached claims, and all equivalents thereof should be construed as being included within the scope of the present disclosure.

When it is determined transmission fails, by monitoring whether emergency call transmission using a telematics module succeeds or fails, embodiments of the present disclosure may improve the success rate of emergency call transmission by making it possible to execute emergency call transmission using another network and another module.

Furthermore, embodiments of the present disclosure may broadly search for available networks including an un-trusted network in preparation for damage to a communication means due to an accident to access one of the found available networks, may change an AVN module to a subject of the emergency call transmission in preparation for damage to the telematics module due to the impact of an accident, may enable an emergency call request message to be generated or sent in preparation for damage to a voice processing device such as a microphone or speaker, and may make all types of emergency calls in preparation for damage to a vehicle due to an accident, thereby quickly and stably coping with the accident.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An emergency call sending apparatus for use in a vehicle, the apparatus comprising:
   a telematics module of the vehicle configured to send an emergency call via a first communication channel when an accident occurs; and
   an emergency call complementing module of the vehicle configured to:
      monitor whether the emergency call executed by the telematics module succeeds or fails, the emergency call being determined as failing when information about whether the emergency call succeeds or fails is not received from the telematics module during a waiting time measured by a timer activated from occurrence of the accident passes a predetermined reference time;
      search for an available network near the vehicle;
      access the available network via a second communication channel when the emergency call transmission fails, the second communication channel different than the first communication channel; and
      control a complement of the emergency call transmission.

2. The apparatus of claim 1, wherein the emergency call complementing module is configured to:
   monitor whether the emergency call transmission using the telematics module succeeds or fails after the accident occurs; and
   control the emergency call transmission using another network and another module to be performed when the emergency call transmission fails.

3. The apparatus of claim 1, wherein the emergency call complementing module includes an emergency call monitoring device configured to:
   monitor whether the emergency call transmission executed by the telematics module succeeds or fails;
   search for an available network accessed by the vehicle and to establish a communication path when the emergency call transmission in the telematics module fails; and
   send the emergency call by using the available network establishing the communication path.

4. The apparatus of claim 3, wherein the emergency call monitoring device is configured to recognize whether the emergency call transmission fails by receiving information about whether the emergency call transmission succeeds or fails from the telematics module.

5. The apparatus of claim 3, wherein the emergency call complementing module is configured to:
   search for one or more available networks capable of being accessed by a communication device provided in the vehicle in which the accident occurs;
   select a network having relatively large signal strength from among the found available networks;
   access the network; and
   establish the communication path.

6. The apparatus of claim 5, wherein the available network is an un-trusted network including WiFi and a hotspot.

7. The apparatus of claim 3, wherein the emergency call complementing module further includes a voice processing device activating device configured to:

determine whether a function of a voice processing device capable of processing a voice signal for the emergency call is operated normally, the voice processing device including a microphone and a speaker; and activate the voice processing device when the function is operated normally.

8. The apparatus of claim 3, wherein the emergency call complementing module further includes a message generating device configured to generate an emergency call request message for providing a notification of whether the accident occurs and an accident vehicle's current location.

9. The apparatus of claim 3, further comprising an audio video navigation (AVN) module configured to complement the emergency call transmission by using the available network establishing the communication path.

10. The apparatus of claim 9, wherein the emergency call complementing device is configured to:
access the available network by using the AVN module; and
execute a VoIP-based emergency call transmission.

11. The apparatus of claim 9, wherein the emergency call complementing device is configured to:
access the available network by using the AVN module; and
execute an SMS-based emergency call transmission for sending an emergency call request message for providing a notification of an accident vehicle's current location.

12. An emergency call sending method, the method comprising:
transmitting an emergency call transmission via a first communication channel in response to an occurrence of a vehicle accident;
monitoring whether the emergency call transmission succeeds or fails, the monitoring being performed in response to the occurrence of the vehicle accident;
determining that the emergency call transmission fails by determining that the emergency call transmission fails when information about whether the emergency call transmission succeeds or fails is not received after a waiting time from occurrence of the vehicle accident until a predetermined reference time;
searching for an available network near the vehicle in response to determining that the emergency call transmission fails;
selecting the available network accessible by a communication device of the vehicle;
establishing a communication path with the available network, the communication path different than the first communication channel; and
performing the emergency call transmission using an audio video navigation module of the vehicle and the available network, the emergency call transmission occurring over the established the communication path.

13. The method of claim 12, wherein the monitoring of whether the emergency call transmission succeeds or fails comprises receiving information about whether the emergency call transmission succeeds or fails.

14. The method of claim 12, wherein searching for the available network comprises:
searching for one or more available networks capable of being accessed by the communication device provided in the vehicle in which the accident occurs and comparing signal strengths of found available networks with one another; and
selecting an available network having a relatively great signal strength from among the found available networks as a network for complementing an emergency call to establish the communication path.

15. The method of claim 12, wherein searching for the available network comprises searching for the available network among un-trusted networks, which include WiFi and a hotspot and which are accessed by the communication device of the vehicle.

16. The method of claim 12, further comprising:
determining whether a function of a voice processing device is operating normally, the voice processing device including a microphone and a speaker and being capable of processing a voice signal for an emergency call; and
after searching for the available network, activating the voice processing device when the function is operating normally.

17. The method of claim 12, further comprising generating an emergency call request message for providing a notification that the accident has occurred and the vehicle's current location, after searching for the available network.

18. The method of claim 12, wherein performing the emergency call transmission comprises:
making a voice-based VoIP emergency call when a voice processing device is operated normally; and
making an SMS-based emergency call for sending an emergency call request message for providing an accident vehicle's current location when the voice processing device is damaged.

19. An emergency call sending apparatus for use with a vehicle, the apparatus comprising:
a telematics module comprising a first communication device, the telematics module configured to send an emergency call via the first communication device when an accident occurs;
an audio video navigation module comprising a second communication device; and
an emergency call complementing module configured to:
monitor whether an emergency call transmission executed by the telematics module succeeds or fails, the emergency call transmission being determined as failing when information about whether the emergency call transmission succeeds or fails is not received from the telematics module during a waiting time measured by a timer activated from occurrence of the accident passes a predetermined reference time;
search for an available network near the vehicle;
access the available network using the audio video navigation module when the emergency call transmission fails; and
control a complement of the emergency call transmission.

* * * * *